United States Patent [19]
Roberts

[11] 3,905,116
[45] *Sept. 16, 1975

[54] CRANKSHAFT BEARING MEASURING APPARATUS

[75] Inventor: George W. Roberts, Markham, Ill.

[73] Assignee: Allis-Chalmers Corporation, Milwaukee, Wis.

[*] Notice: The portion of the term of this patent subsequent to Apr. 15, 1992, has been disclaimed.

[22] Filed: Oct. 15, 1973

[21] Appl. No.: 406,660

[52] U.S. Cl. ............ 33/174 L; 33/125 R; 33/180 B; 33/181 R; 33/181 AT; 51/165.75; 82/9
[51] Int. Cl.².. G01B 5/14; B23B 5/00; B24B 49/10; B23Q 17/00
[58] Field of Search........ 33/180 B, 180 AT, 181 R, 33/181 AT, 125 M, 125 A, 125 R, 174 L; 51/105 SP, 165.74, 165.75; 82/9

[56] References Cited
UNITED STATES PATENTS

| | | |
|---|---|---|
| 3,504,441 | 4/1970 | Linley et al. ..................... 33/174 L |
| 3,624,910 | 12/1971 | Farrand............................ 33/125 R |
| 3,780,474 | 12/1973 | Ota.................................. 51/105 SP |

*Primary Examiner*—Richard E. Aegerter
*Assistant Examiner*—Steven L. Stephan
*Attorney, Agent, or Firm*—Arthur L. Nelson

[57] ABSTRACT

A crankshaft bearing measuring apparatus for aligning a crankshaft and measuring axially the bearing locations for subsequent machining operations on the crankshaft. The measuring apparatus employs a carriage moving on an axis parallel with the crankshaft axis.

10 Claims, 10 Drawing Figures

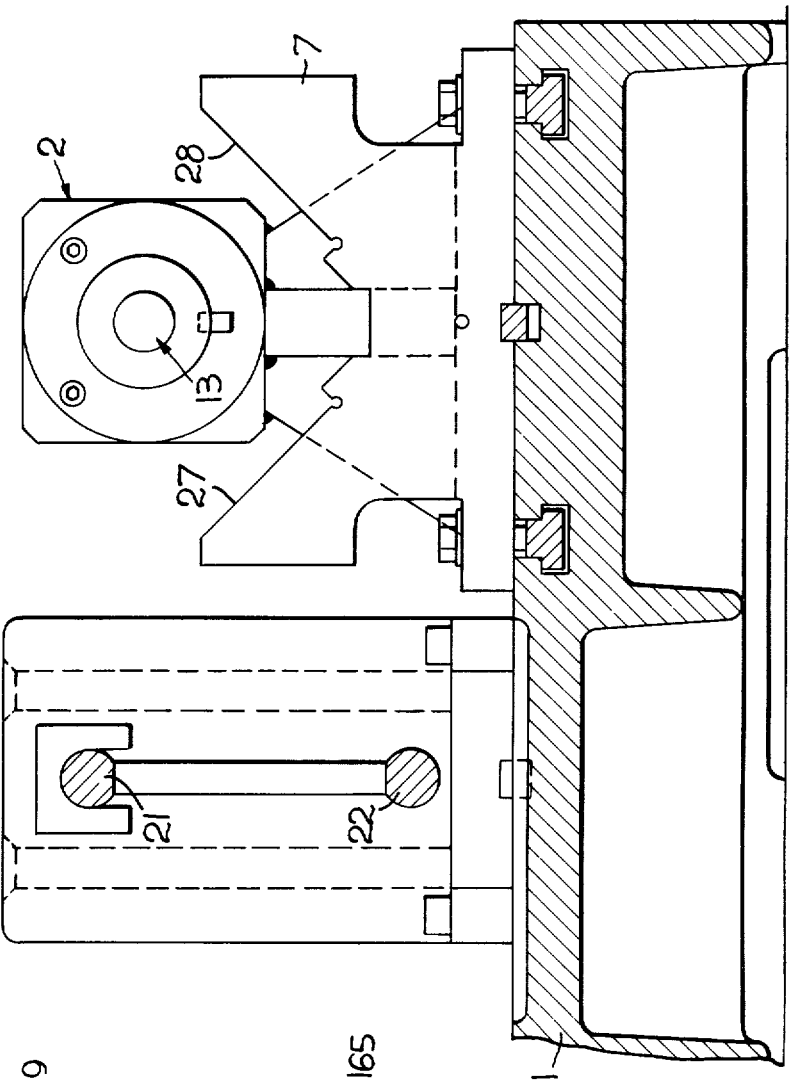
Fig. 6
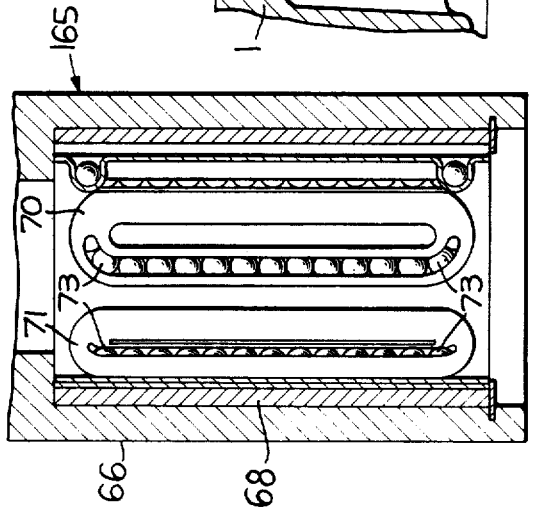
Fig. 7
Fig. 8

CRANKSHAFT BEARING MEASURING APPARATUS

This invention relates to a crankshaft bearing measuring apparatus and more particularly to an apparatus for aligning the crankshaft on centering means and measuring bearing locations with a measuring probe on a carriage moving parallel to the crankshaft axis for subsequent machining operations on the crankshaft.

The machining operations for forming crankpin and main bearings on a crankshaft require precision alignment and precision machining. In the process of manufacturing a conventional method for measuring crankshafts is to place a master crankshaft between centers and preset a plurality of micrometers with dial indicators on a single bar for engaging the machined faces of the crankshaft. The readings of the dial indicators indicate to the operator the desired position of each of the facings on the crankshaft at which the bearings should be located. The master crankshaft is then removed and the crankshaft to be machined is then placed in the fixture. The indicator readings of the micrometers are then read and an analysis is mentally made by referring to the specifications print indicating the bearing locations. A predetermined allowance is made for grinding stock on each face which generally is approximately fifteen thousandths of an inch. This information is then orally given to the machine operator and the crankshaft is then machined to comply with the master crankshaft which is in conformity with the specifications on the reference drawing. This procedure is time consuming and often leaves a chance for errors, and once the crankshaft is machined it cannot be redone particularly where too much metal has been removed from the crankshaft.

Conventional forged crankshafts are manufactured with dimensions marked on the crankshaft. Centrally located in each end of the crankshaft is a coned recess for reception of the centering cones of the alignment apparatus. Also, an imaginary plane normal to the longitudinal axis of the crankshaft is established by a ball of predetermined size received in the coned recess on the flange end of the crankshaft. The imaginary plane is tangent to the crankshaft end of the ball and is a predetermined dimension from a punch mark on one of the center cheeks of the crankshaft. With this relationship of alignment and the dimension established a crankshaft can be machined and all faces will clean up and a minimum amount of stock removal will be required for balance.

Accordingly, this invention provides for an apparatus which will provide crankshaft alignment and bearing measurements required in conformity with the original dimensions on the crankshaft for reduction of waste stock to a minimum during subsequent machining.

It is an object of this invention to provide a crankshaft aligning and measuring device to axially locate bearings for subsequent machining operations on the crankshaft.

It is a further object of this invention to provide an aligning and measuring apparatus for a crankshaft with a measuring carriage carried on an axis parallel with the axis of the crankshaft for accurately spacing bearing locations on the crankshaft.

It is a further object of this invention to provide a crankshaft bearing locating apparatus for aligning the crankshaft axis and provide a measuring carriage on a parallel axis having a probe for measuring bearing locations on the crankshaft for subsequent machining operations.

The objects of this invention are accomplished by providing a crankshaft supporting apparatus having aligning cones which engage centering recesses in the ends of the crankshaft to provide axial alignment of the crankshaft. The centering cones determine the axial position of the crankshaft and imaginary plane a predetermined distance from a mark on one of the center cheeks of the crankshaft by the depth of the coned recess on the flange end of the crankshaft. With this alignment a reference plane is established on the apparatus from which a measuring device consisting of a digital readout provides a zero reference point from which the bearings in the crankshaft are subsequently located. The bearings are then machined in subsequent machining operation of the crankshaft.

A reciprocating probe is positioned on a carriage normal to the line of movement of the carriage. The carriage runs an axis parallel with the axis of the crankshaft and the probe is movable axially and pivotally for positioning a probe surface for measuring surfaces on the crankshaft. The probe is freely movable pivotally and axially while the carriage moves along an axis parallel with the crankshaft axis to thereby provide a measuring device to accurately determine bearing locations in accordance with a reference drawing which is available to the operator.

Referring to the drawings:

FIG. 6 is a cross section view taken through the carriage rails and the alignment device showing the preliminary alignment block on the right hand side of the apparatus;

FIG. 7 is a cross section view of one of the linear bearings showing the bearing tightening set screw;

FIG. 8 is a cross section view taken axially of one of the linear bearings as used on the alignment probe to show the mounting of the recirculating balls in the retainer sleeve of the linear bearing;

Figure 1:
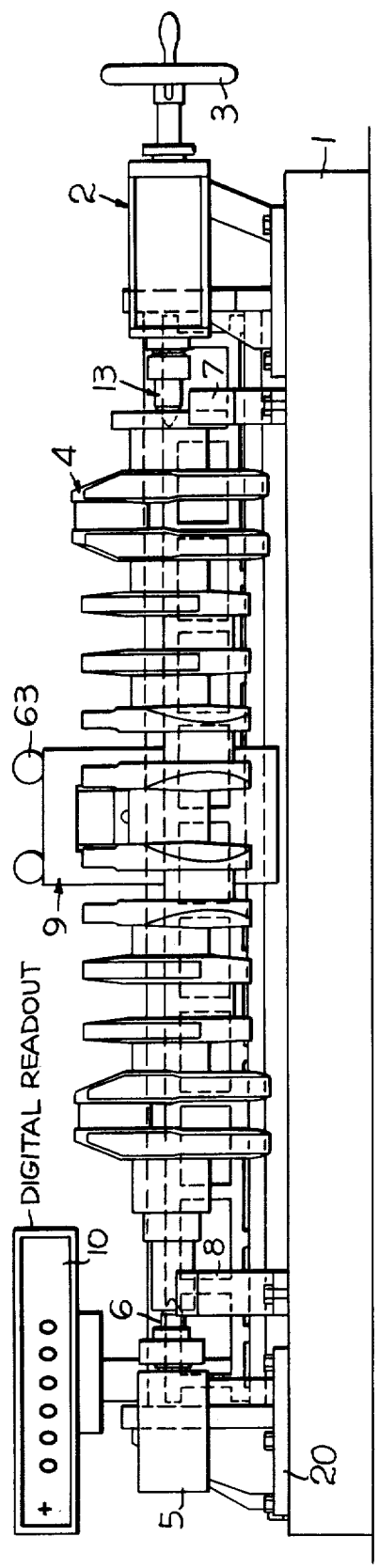
FIG. 1 illustrates a front view of the apparatus.

FIG. 1 shows the bearing measuring apparatus. The apparatus includes the main frame 1, the tailstock 2 is mounted on the right-hand side of the main frame and includes a hand-wheel 3 for adjustably positioning the dead center 13 for reception in a conical recess in the end of the crankshaft 4.

The headstock 5 includes a spindle nose 6 for reception in a conical recess in the left-hand end of the crank-shaft 4. The preliminary alignment blocks 7 and 8 provide support for the crankshaft prior to its engagement with the headstock and a tailstock. By positioning the crankshaft initially on the preliminary alignment blocks 7 and 8, the alignment is sufficiently close that the coned-shaped noses of the dead center 13 and the spindle nose 6 enter the recesses on the ends of the crankshaft as the handwheel 3 moves the dead center towards the crankshaft. The carriage 9 is mounted on rails which are axially aligned parallel with the axis of the crankshaft. The carriage 9 moves on linear bearings which embrace the rails and support the carriage.

The digital readout 10 is also positioned on the frame of the measuring apparatus or on a pedestal adjacent to the apparatus for providing a digital readout of the carriage position relative to a base point which is predetermined prior to measuring of the crankshaft.

The digital readout 10 may be one of various forms of digital readouts, however the Cordax digital readout manufactured by the Bendix Company is an ideal digital readout which adapts itself well to this type of measuring. The Cordax readout provides for a graduated transparent scale along the length of the rails with a light source directing light through the scale. A photoelectric cell senses the light signal and generates an electrical signal as the carriage is moved along the scale. The pickup from the photoelectric cell is then transmitted through an electrical circuit which in turn provides a digital readout from the Cordax as shown in FIG. 1.

Figure 2:
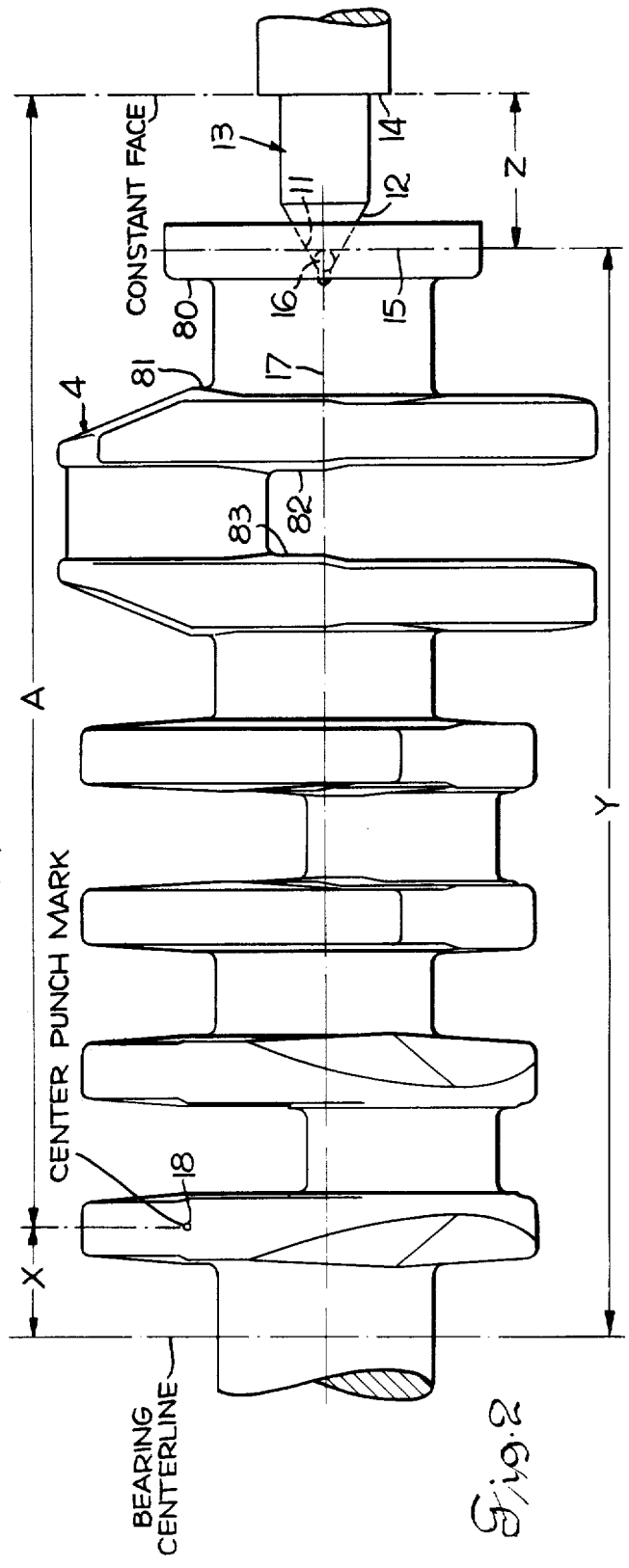
FIG. 2 is an enlarged view of the right-hand end of the crankshaft showing the tailstock engaging the end of the crankshaft and the base dimensions on the crankshaft and crankshaft support.

FIG. 2 shows an enlarged view of the crankshaft 4 which is to be measured. The crankshaft 4 is provided with a conical recess 11, which engages the conical surface 12 of the dead center 13. The dead center 13 forms a reference surface or facing 14 which operates as the zero reference plane in the readout system. An imaginary plane is formed at 15. This plane is defined by a ball 16 of a predetermined diameter which engages the conical surface 11. The extreme right-hand limit of the ball is tangent to the imaginary plane 15 which is normal to the axis 17 of the crankshaft 4. A predetermined axial dimension from the imaginary plane 15 a center punch mark 18 is located. The axial dimension between the imaginary plane 15 and the punch mark 18 establishes a working relationship from which the operator can work. With the imaginary plane 15 established and the known taper of the dead center 13, the constant face 14 is established which is the base reference surface for the operator.

Figure 3:
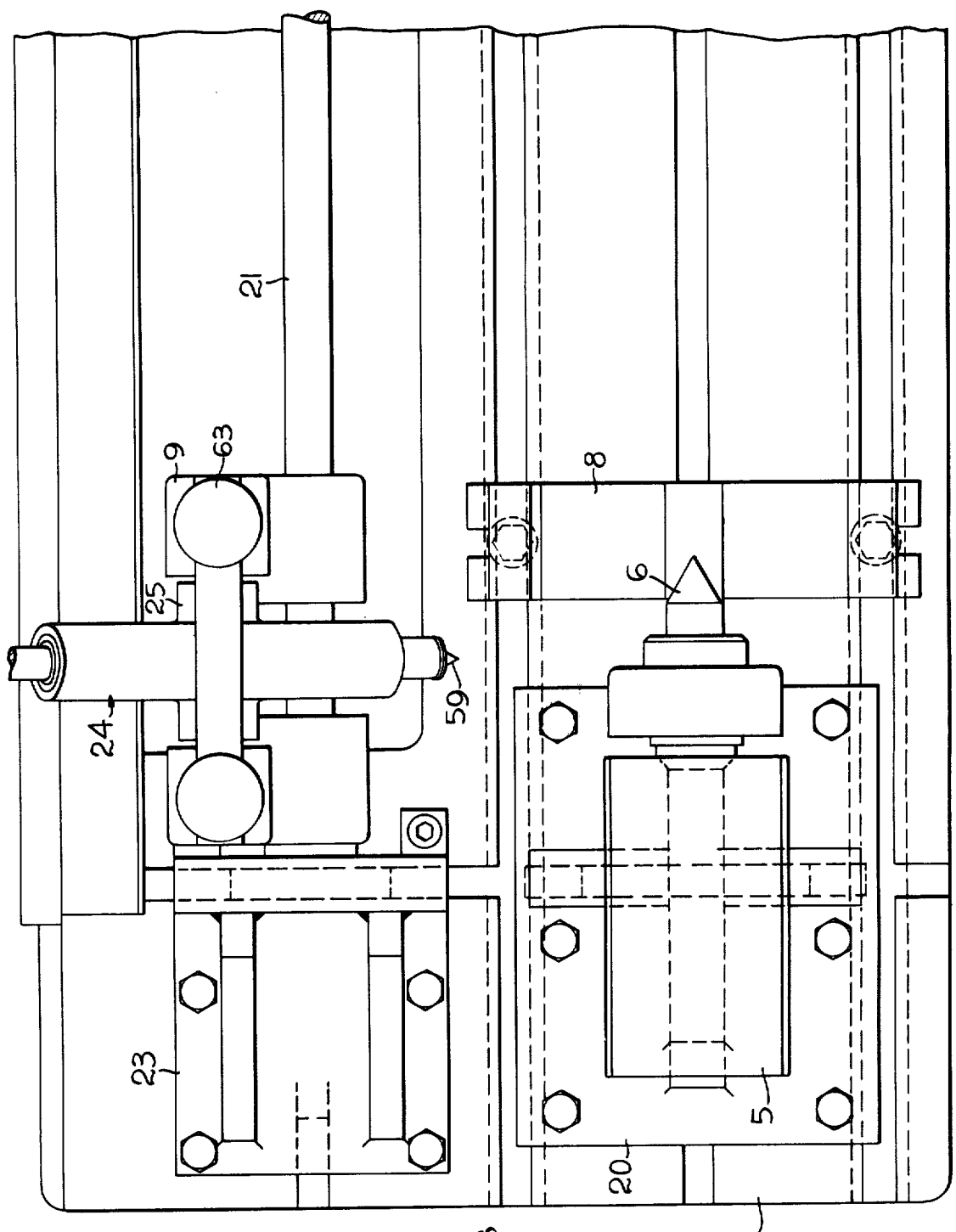
FIG. 3 is a plan view of the headstock of the aligning device and the measuring carriage in its extreme left-hand position.
Figure 9:
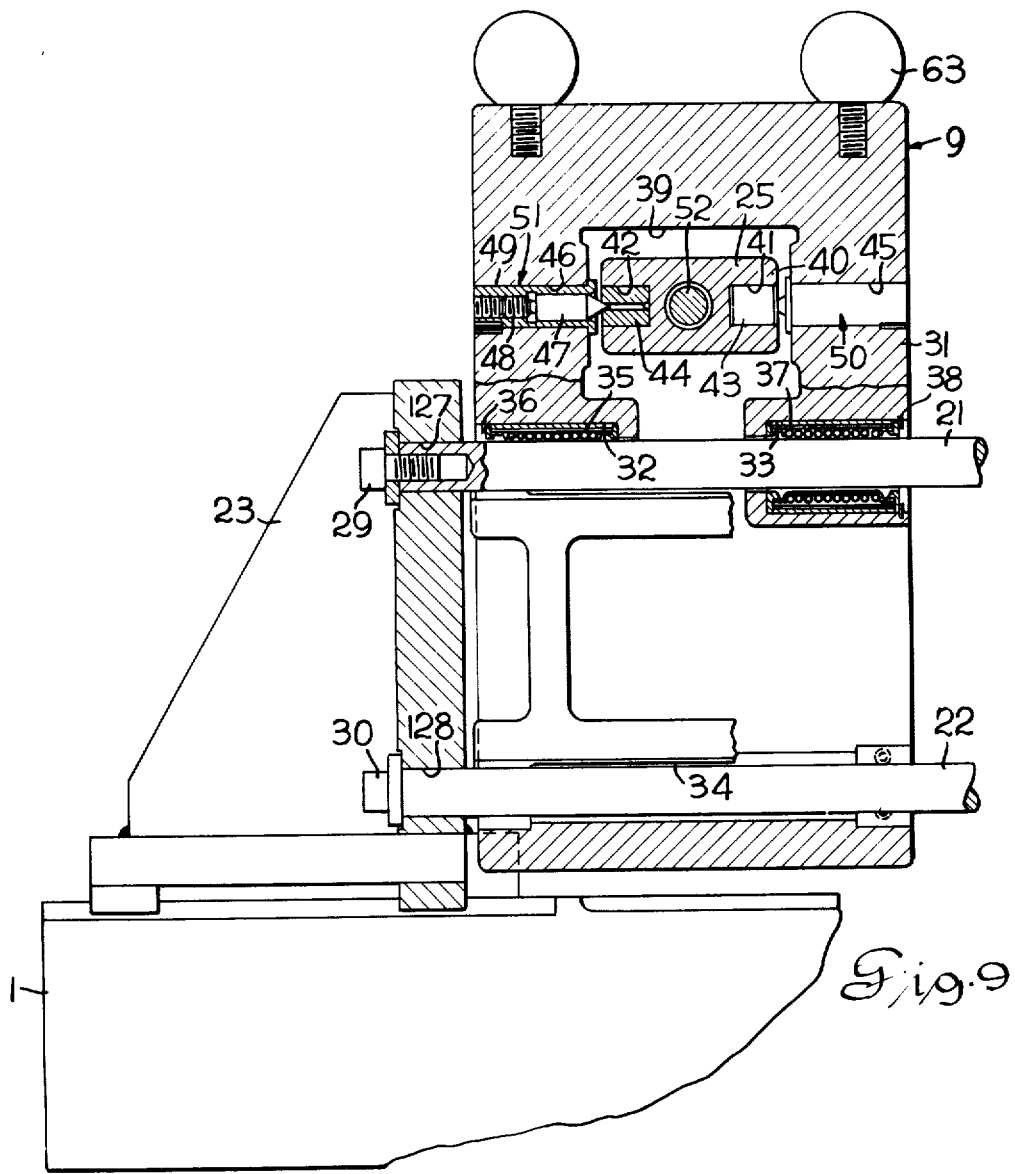
FIG. 9 is a cross section view through the carriage showing the pivotal mount for the probe and a cross section view of a portion of the linear bearings and the rail mounting.

Referring to FIG. 3 the headstock 5 is shown mounted by means of the bracket 20 which is supported on the main frame 1. The headstock is in a fixed axially alignment relative to the rails 21 and 22 of which the upper rail 21 is shown in FIG. 3. The carriage 9 is reciprocally mounted on the rails 21 and 22. The rails 21 and 22 are supported on the rail mount 23 which is fastened by a plurality of bolts to the main frame 1. The probe 24 is carried on a trunnion mount 25. The trunnion mount 25 is shown and described in FIG. 9.

Figure 4:
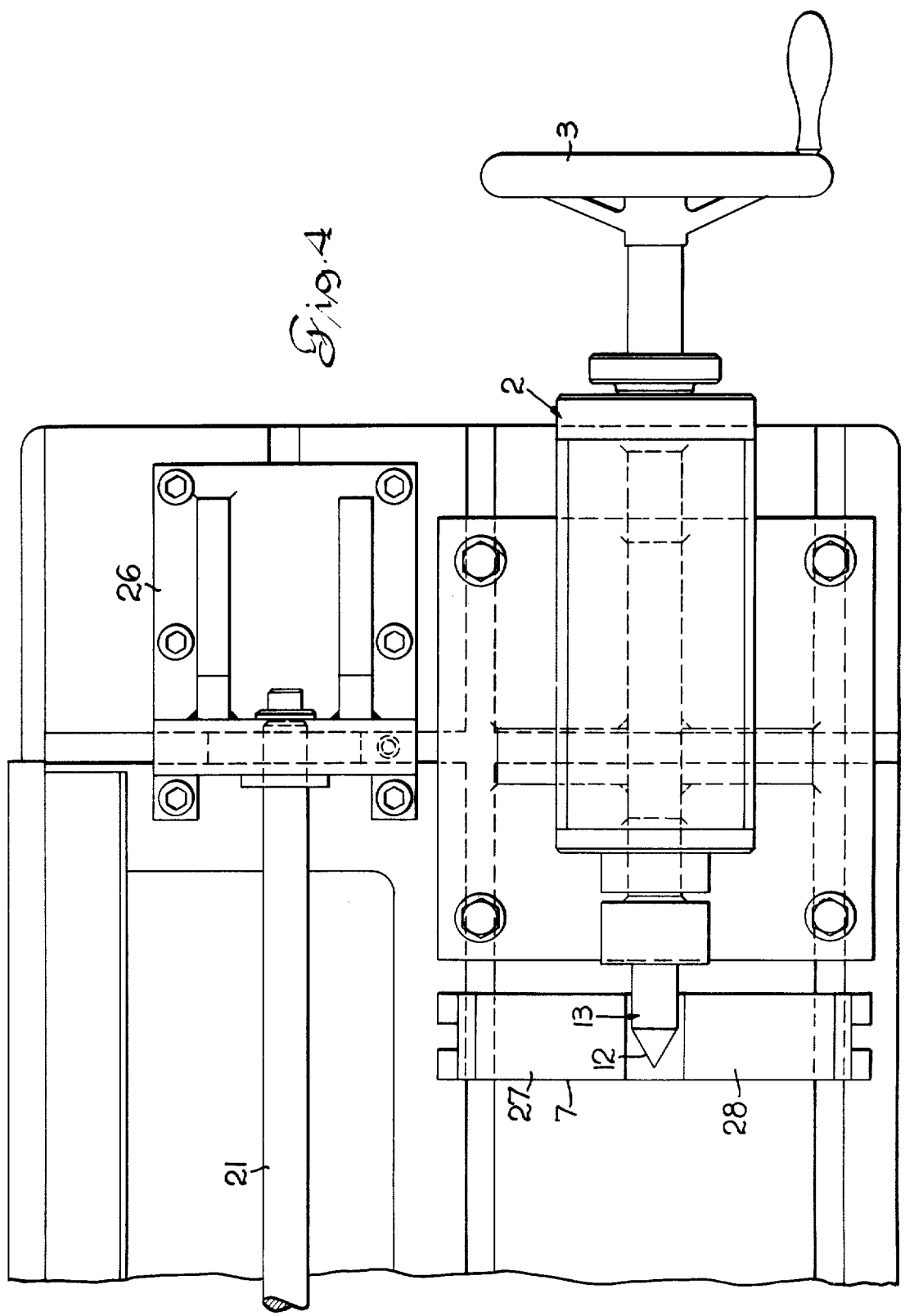
FIG. 4 is a plan view of the tailstock and the right-hand rail mount for the carriage.

FIG. 4 shows the plan view of the right-hand end of the apparatus. The rail mount 26 is mounted by means of a plurality of bolts on the main frame. The rail 21 is shown receiving the rail mount 26.

The tailstock 2 including the handwheel 3 is provided for a screw positioning of the dead center 13. The conical surface 12 of the dead center 13 is shown immediately above the preliminary alignment block 7 which has supporting surfaces 27 and 28 for placing the flange end of the crankshaft to ready the crankshaft for alignment as it is received on the conical surface 12 of the tailstock 2.

The rails 21 and 22 extend between the rail mounts 23 and 26. Each rail extends into an opening 127 or 128 as shown in the rail mount 23 in FIG. 9. The bolt 29 locks the rail 21 in a rigid position on rail mount 23. The bolt 30 also locks the rail 22 in a rigid position. It is understood that each of the rails have a close fitting tolerance within the opening in which it is mounted to provide an accurate alignment of the rails with reference to the center line of the headstock.

The carriage 9 includes a base 31 having longitudinal openings 32 and 33 through which the rail 21 extends. The rail 22 extends through a longitudinal opening 34. A linear bearing 35 is received within the opening 32 and retained by a snap ring 36. The linear bearing permits the carriage to move freely along the rail 21. Similarly, a linear bearing 37 is received within the opening 33 and retained in this position by the snap ring 38. A pair of linear bearings are also positioned to embrace the lower rail 22 and retained in the base 31 in the same manner as that described for the bearings 35 and 37. Accordingly, the rail moves on the recirculating balls in the linear bearings as the carriage 9 is moved axially on the rails 21 and 22.

The transverse opening 39 receives the probe 24 which is trunnion mounted. The trunnion mount includes a housing 40 having transverse openings 41 and 42 which receive the inserts 43 and 44. The base 31 of the carriage also defines axially aligned holes 45 and 46. The bearing cone 447 is received in a coned-shaped recess in insert 44 and held in this position by an adjusting screw 48. The cone bearing 47 is received within the sleeve 49. A similar arrangement is provided in the right hand end of the trunnion bearing 50 is described for the trunnion bearing 51. Accordingly, the trunnion bearings 50 and 51 have means for adjusting them to provide an accurate alignment and a tight fit as it is rotated about its axis.

The shaft 52 of the probe is slidable within the housing 40. The linear bearing 53 is received within an opening 54 and retained in this position by snap ring 55. The linear bearing 56 is received within the opening 57 and retained in this position by snap ring 58. The linear bearings 53 and 54 provide a freely slidable bearing structure for the probe 52 as it slides linearly through the bearings.

The conical tip 59 is shown received within a collect 60 which can be tightened to retain the tip in this position for engaging a point on the crankshaft. Similarly, the collet 60 can be loosened to permit positioning of a tip 61 which has a lateral surface for engaging a radial facing on the crankshaft. The zero setting of the readout can be conveniently reset to accommodate either tip 59 or 61 for an accurate measurement of any surface or point on the crankshaft.

The probe 24 is also provided with a knurled section 62 for moving the shaft axially through the linear bearings 53 and 56. Handle 63 is provided in the upper portion of the carriage to move the carriage axially on the rails 21 and 22.

Figure 5:
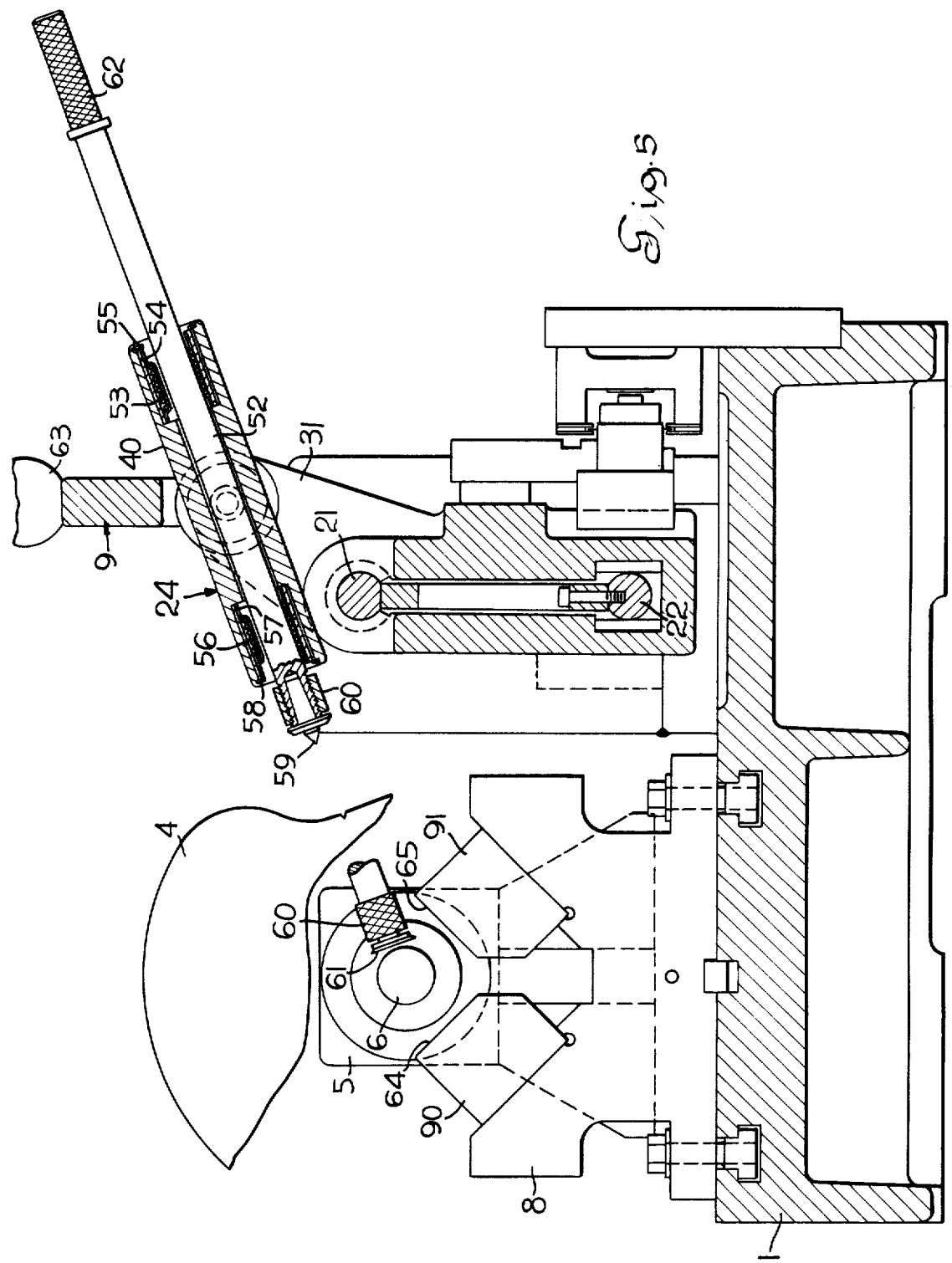
FIG. 5 is a cross section view taken through the carriage and the rails and also taken immediately in front of the headstock of the alignment device.

FIG. 6 shows a view of the tailstock 2 for supporting the right-hand end of the crankshaft as shown in FIG. 1. A preliminary alignment block 7 is provided with bearing surfaces 27 and 28. FIG. 5 shows the headstock 5 and the preliminary alignment block 8 providing surfaces 64 and 65 for laying the crankshaft in preparation for mounting the crankshaft on the centering nose end of the headstock and tailstock.

Figure 10:
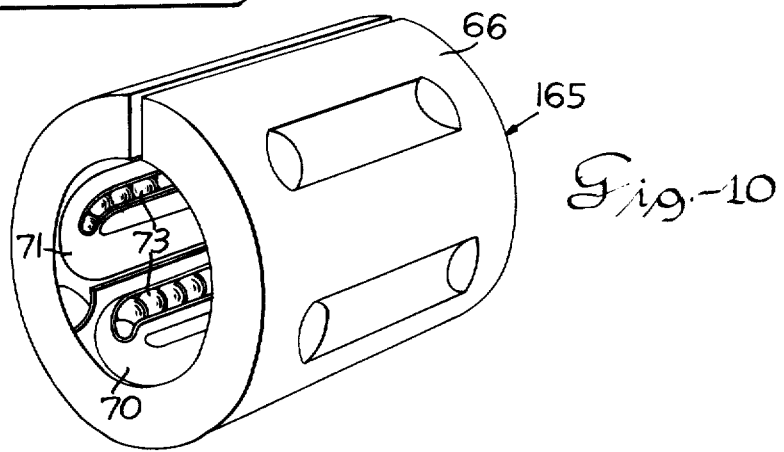
FIG. 10 is a three-dimentional view of one of the linear bearings.

Referring to FIGS. 7, 8 and 10 the linear bearing is shown in detail. The linear bearing 165 includes a split bushing 66 which permits radial expansion and contraction of the sleeve 66. This expansion is primarily for providing a tight fitting of the linear bearing in the housing in which it received. Also threadedly received in the sleeve is a setscrew 67, which radially contracts a retainer sleeve 68. The retainer sleeve 68 embraces the ball retainers 69. A plurality of ball retainers 69 are shown. The ball retainers provide a plurality of recirculating ball circuits 70 and 71 such as shown in FIG. 8. The balls 73 engages the shaft 74 to permit linear movement of the shaft relative to the linear bearing. The bearings are recirculated in each of their circuits. The balls are rolling in a linear manner while engaging shaft 74. The bearing is also shown in FIG. 10 in a three-dimensional view, which shows the recirculating movement of the balls in the ball retainers 69. If the bearing becomes loose the setscrew 67 can be tightened against the retainer sleeve to radially contract the retainer sleeve and tighten the balls against the shaft 74 to eliminate any play in the bearings. Such a bearing as illustrated in FIGS. 7, 8 and 10 is manufactured by the Thomson Industries, Inc. for providing linear motion of a shaft relative to the bearing bushing.

A measuring of a crankshaft to locate the bearings is accomplished in the following manner. The crankshaft as shown in FIG. 2 shows the right-hand section of the crankshaft which is positioned on the measuring apparatus. The crankshaft is conventionally forged and then rough balanced to determine the preferred position for the bearings surfaces and the preferred alignment on the crankshaft. This is accomplished by what is known as a basket balancing which rotates the crankshaft to determine in what position the crankshaft should be machined to require the least amount of machining and still achieve a balanced crankshaft as a finished product. Initially, conical recesses are drilled in the extreme ends of the crankshaft in the position which would accomplish the least machining. As illustrated in FIG. 2 a conical recess is drilled in the flange end or the right-hand end of the crank-shaft. This conical recess is of a predetermined taper, and it is drilled to a depth which determines the preferred axial alignment of the bearing locations. An imaginary plane is established by the drilling of the conical recess 11 to a predetermined depth. If a ball 16 of a predetermined diameter be inserted in the conical recess, the right-hand point of the ball would form a point tangent to an imaginary plane 15 which is normal to the axis of the crankshaft. With a dead center at a complementary taper and dimension to facing 14 this positions the axial location of the crankpin bearings and the main bearings. A center punch mark 18 is also positioned on one of the center cheeks of a 6 throw crankshaft as illustrated. The center punch mark 18 is positioned a predetermined axial dimension from the imaginary plane 15. Accordingly, the point 18 and the plane 15 together with the axially aligned conical recesses in the end of the crankshaft establish the axis of the crankshaft and the positioning of the bearings on the crankshaft. It is this predetermined plane and axis which then establishes the machining to be done on the crankshaft.

The measuring steps in the manufacture of the crankshaft is to position the crankshaft in the measuring apparatus as set forth in this invention. The flange end or the right-hand end of the crankshaft is positioned on the preliminary alignment block 7 while the left-hand end of the crankshaft is positioned on the preliminary alignment block 8. It is noted that the flange end will then rest on the surfaces 27 and 28 while the left-hand end will rest on the surfaces 64 and 65 of the blocks 90 and 91 on the preliminary alignment block 8. Once the crankshaft is in this position the handwheel 3 of the tailstock 2 is then rotated to force the centering cones of the headstock and tailstock to axially align the crankshaft axis with the headstock and tailstock axis. Accordingly, the axis of the crankshaft and the headstock and tailstock are then coincidental.

Since the conical surface 12 is of predetermined taper complementing the same taper of the recess 11, as the dead center 13 is positioned in the recess 11 the reference face 14 is then a predetermined dimension Z from the imaginary plane 15. Likewise, the dimension A is determinable from this reference, since the reference drawing for the machining of the crankshaft establishes the center of the crankshaft of the center of the center main bearing as a base point for all dimensioning. The dimension from the center punch mark to the center of the centerline of the center main bearing is a dimension X. The dimension Y is the dimension between the imaginary plane 15 and the centerline which extends through the center of the center main bearing in a transverse direction. With these dimensions known then, the position of each of the crankpin and main bearings can then be established by measuring from the reference face 14. With the crankshaft mounted in the measuring apparatus, the probe is then fitted with the proper tip 59 or 61 for measuring of the crankshaft.

With the tip 61 the dimension from the reference face 14 is preset at zero when the surface on the periphery of the tip 61 engages the reference surface reference face 14. The facings 80 and 81 of the main bearings and the surfaces 82 and 83 may then be measured and the amount of material to be machined from the bearing is then determined. Subsequent to presetting the Cordax or the digital readout to zero at the reference face 14, the reading is automatically made as the probe is moved axially for engagement with the facings 80 and 81 or 82 and 83 on the crankshaft or for any other of the main bearings or crankpin bearings of the crankshaft. With a probe having a tip with a point such as the tip 59 the center punch mark 18 may be measured from any surface on the crankshaft. With the given dimensions from the reference drawing of the crankshaft forging any positioning of the bearings can be determined and an accurate alignment of the bearings on the crankshaft may be readily located.

The probe is at right angles to the axis of the rails and the axis of the crankshaft and accordingly any movement of the probe about its trunion mounting or reciprocally within the base of the probe does not create any error. Accordingly this apparatus provides a convenient way to accurately measure locations of facings and surfaces for bearings on the crankshaft.

The embodiments of the invention in which an enclosure property or privilege is claimed, are defines as follows:

1. A crankshaft measuring apparatus for crankshafts having an axially aligned centering recess of a predetermined taper in each end of the crankshaft with at least one of said recesses having a predetermined axial position relative to the axial center of the crankshaft comprising, a crankshaft support having crankshaft center locating means defining a support axis for supporting the crankshaft axis on said support axis, carrier rail means parallel with said support axis, a carriage mounted on said rail means reciprocally moving on an axis parallel with said support axis, a probe on said carriage including means movably mounting said probe for movement in a plane normal to the support axis including means reciprocally mounting said probe on an axis perpendicular with the support axis, means pivotally mounting said probe on said carriage for movement about an axis parallel with said support axis, means defining a reference surface on said crankshaft support adapted for establishing a zero reference reading for said measuring apparatus, a predetermined tapered surface on said crankshaft support axially positioned in a predetermined axial position relative to said reference surface, said tapered surface positioning said crankshaft responsive to reception in said one of said recesses in the crankshaft of a predetermined axial position relative to the axial center of the crankshaft, a measuring point on said probe for touching said reference surface on said crankshaft support and points and surfaces on said crankshaft, a carriage measurement readout sensing movement of said carriage relative to the crankshaft support for providing a readout of axial dimensions from the reference surface of said crankshaft support and reading axial dimensions on said crankshaft for locating bearing surfaces.

2. A crankshaft measuring apparatus for crankshafts having an axially aligned centering recess in each end of the crankshaft as set forth in claim 1 wherein said crankshaft support includes preliminary support structure for roughly aligning said crankshaft on said supporting structure, centering cones on said crankshaft support for axially aligning said centering recesses on said crankshaft on the support axis.

3. A crankshaft measuring apparatus for crankshafts having an axially aligned centering recess in each end of the crankshaft as set forth in claim 1 wherein said crankshaft support includes a headstock and a tailstock having centering cones for aligning said crankshaft on the support axis.

4. A crankshaft measuring apparatus for crankshafts having an axially aligned centering recess in each end of the crankshaft as set forth in claim 1 wherein said carrier rails define cylindrical rods extending parallel with the support axis, said crankshaft support includes a headstock and a tailstock to define the support axis for supporting said crankshaft.

5. A crankshaft measuring apparatus for crankshafts having an axially aligned centering recess in each end of the crankshaft as set forth in claim 1 wherein said crankshaft support includes a headstock and an axially adjustable tailstock each having centering cones for aligning the crankshaft axis on the support axis.

6. A crankshaft measuring apparatus for crankshafts having an axially aligned centering recess in each end of the crankshaft as set forth in claim 1 wherein said probe includes a handle to pivotally and reciprocally control said probe for movement in measuring said crankshaft.

7. A crankshaft measuring apparatus for crankshafts having an axially aligned centering recess in each end of the crankshaft as set forth in claim 1 wherein said readout system includes a digital readout to directly read incremental movement of said carrier relative to the crankshaft and crankshaft support.

8. A crankshaft measuring apparatus for crankshafts having an axially aligned centering recess in each end of the crankshaft as set forth in claim 1 wherein said carriage includes linear bearings embracing said rails to permit linear movement of said carriage relative to said rails.

9. A crankshaft measuring apparatus for crankshafts having an axially aligned centering recess in each end of the crankshaft as set forth in claim 1 including at least one linear bearing in said carriage embracing each one of said rails, means for tightening each of said bearings to radially contact a retainer sleeve to eliminate any looseness in said bearing engaging said rail to maintain alignment of said carriage on said rails.

10. A crankshaft measuring apparatus for crankshafts having an axially aligned centering recess in each end of the crankshaft as set forth in claim 1 wherein said probe includes a tip defining a contact point for engaging a surface on said crankshaft support and surfaces on said crankshaft for axially measuring dimensions on said crankshaft relative to said crankshaft support.

* * * * *

UNITED STATES PATENT OFFICE
CERTIFICATE OF CORRECTION

Patent No. 3,905,116  Dated September 16, 1975

Inventor(s) George W. Roberts

It is certified that error appears in the above-identified patent and that said Letters Patent are hereby corrected as shown below:

Column 8, line numbered 37, "contact" should be

--- contract ---.

Signed and Sealed this eleventh Day of May 1976

[SEAL]

Attest:

RUTH C. MASON  
Attesting Officer

C. MARSHALL DANN  
Commissioner of Patents and Trademarks